(12) United States Patent
VerWoert et al.

(10) Patent No.: US 8,958,949 B2
(45) Date of Patent: Feb. 17, 2015

(54) VEHICLE TEMPERATURE CONTROL SYSTEMS

(71) Applicant: Toyota Motor Engineering & Manufacturing North America, Inc., Erlanger, KY (US)

(72) Inventors: Cherrie-Lyn Madeline VerWoert, Saline, MI (US); Fred Lupton, III, Saline, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 24 days.

(21) Appl. No.: 13/856,007

(22) Filed: Apr. 3, 2013

(65) Prior Publication Data

US 2014/0303835 A1 Oct. 9, 2014

(51) Int. Cl.
*G06F 7/00* (2006.01)
*B60H 1/00* (2006.01)

(52) U.S. Cl.
CPC .................. *B60H 1/00642* (2013.01)
USPC ........................................ 701/36

(58) Field of Classification Search
CPC ...................................... B60R 16/00
USPC ........................................ 701/36
See application file for complete search history.

(56) References Cited

U.S. PATENT DOCUMENTS

| 4,759,269 | A | 7/1988 | Brown et al. |
| 5,024,265 | A | 6/1991 | Buchholz et al. |
| 6,460,356 | B1 * | 10/2002 | Tao et al. ................. 62/175 |
| 6,868,900 | B2 * | 3/2005 | Dage et al. ................ 165/203 |
| 7,693,591 | B2 | 4/2010 | Hoglund et al. |
| 7,957,839 | B2 | 6/2011 | Takach et al. |
| 2008/0110185 | A1 * | 5/2008 | Veettil et al. ............. 62/115 |

OTHER PUBLICATIONS

Help keep a constant climate; http://my.vw.com/2012-passat/comfort/climatronic-heating-cooling.
C7: disable dual climate?; http://forums.audiworld.com/archive/index.php/t-2811434.html.

* cited by examiner

*Primary Examiner* — James Trammell
*Assistant Examiner* — Michael D Lang
(74) *Attorney, Agent, or Firm* — Dinsmore & Shohl LLP

(57) ABSTRACT

A vehicle temperature control system including a first and second heating, ventilation, and air conditioning (HVAC) unit comprising a first compressor, a first blower, and a first heating element and a first ducting in fluid communication with the first HVAC unit that selectively directs air to a first zone, a second zone, and a third zone of a vehicle through a plurality of outlet vents. The vehicle temperature control system also includes an electronic controller electrically coupled to the first HVAC unit and the second HVAC unit, the electronic controller comprising a synchronization device, a processor, and a memory, where the processor controls operation of the first HVAC unit and the second HVAC unit by controlling operating states of the first and second HVAC units and selectively modifies an operating state of the second HVAC unit to match the operating state of the first HVAC unit.

19 Claims, 7 Drawing Sheets

VEHICLE TEMPERATURE CONTROL SYSTEMS

TECHNICAL FIELD

The present specification generally relates to temperature control systems for vehicles and, more specifically, temperature control systems for synchronizing temperatures across a vehicle cabin.

BACKGROUND

Vehicles may have a heating, ventilation, and air conditioning (HVAC) unit or system that provides conditioned air to a cabin of the vehicle. Vehicle occupants may have different preferences for air temperature, air speed, or the location of delivery of the air as it is delivered to the cabin. Some vehicles may allow vehicle occupants to independently select settings as related to conditioned air delivered to their portion of the cabin. However, these independently selected settings may remain in effect after the vehicle occupants have left the vehicle. This may make it difficult for a single vehicle user to adjust the HVAC settings of a portion of the vehicle other than his own, or to assess what the current HVAC settings are for portions of the vehicle other than his own.

Accordingly, alternative systems for controlling temperatures in a vehicle may be desired.

SUMMARY

In one embodiment, a vehicle temperature control system may include a first HVAC unit comprising a first compressor, a first blower, and a first heating element, and a first ducting in fluid communication with the first HVAC unit that selectively directs air to a first zone and a second zone of a vehicle through a plurality of outlet vents. The vehicle temperature control system may also include a second HVAC unit comprising a second compressor, a second blower, and a second heating element, a second ducting in fluid communication with the second HVAC unit that selectively directs air to a third zone of the vehicle through a plurality of outlet vents, and an electronic controller electrically coupled to the first HVAC unit and the second HVAC unit. The electronic controller includes a synchronization device, a processor, and a memory storing a computer readable instruction set wherein, when the computer readable instruction set is executed by the processor, the processor controls operation of the first HVAC unit and the second HVAC unit by controlling operating states of the first and second HVAC units and selectively modifies an operating state of the second HVAC unit to match the operating state of the first HVAC unit.

In another embodiment, a vehicle temperature control system may include a HVAC unit comprising a compressor, a blower, and a heating element, a feed plenum, a plurality of outlet vents positioned in a first zone, a second zone, and a third zone, and ducting in fluid communication with the HVAC unit, the feed plenum, and the plurality of outlet vents, the ducting comprising a plurality of dampers adapted to selectively open and close to modify a proportion of air delivered to each of the first, second, and third zones from the feed plenum. The vehicle temperature control system may also include an electronic controller comprising a synchronization device, a synchronization confirmation indicator, a processor, and a memory storing a computer readable instruction set wherein, when the computer readable instruction set is executed by the processor, the processor controls positioning of the dampers to provide a uniform proportion of air delivered to each of the first, second, and third zones from the feed plenum; and illuminates portions of the synchronization confirmation indicator corresponding to the first, second, and third zones whose operation is synchronized.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
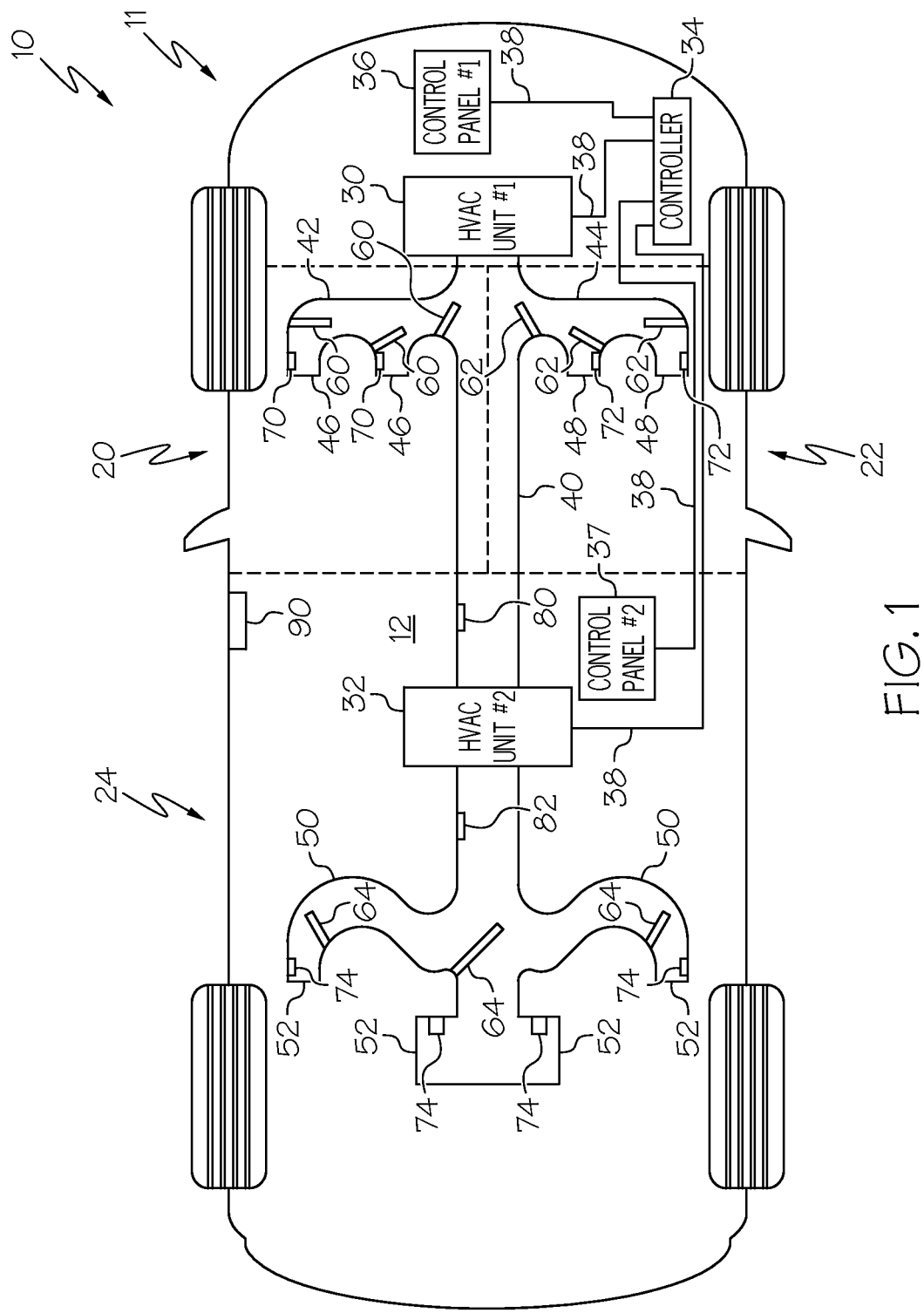
FIG. 1 depicts a schematic top view of a vehicle temperature control system according to one or more embodiments shown and described herein.

Referring generally to FIG. 1, embodiments described herein are directed to vehicle temperature control systems. A vehicle may include a cabin that includes three or more zones, with each zone corresponding to a different passenger seating region within the cabin. The vehicle may include two heating, ventilation, and air conditioning (HVAC) units that deliver conditioned air to different zones within the vehicle cabin. The vehicle may also include at least two control panels having a plurality of input controls, for example a temperature selection device, a fan speed selection device, and a synchronization device with one or more synchronization confirmation indicators. The HVAC units and control panels may be electrically coupled to a controller having a processor and memory. The controller includes logic that, when executed by the processor, provides the vehicle occupants with control of the operating states of each HVAC unit. The vehicle may also include temperature sensors located within ducting and/or within the vehicle cabin that are electrically coupled to the controller. The temperature sensors provide the controller with measurements of ambient temperatures of the associated proximate zones within the vehicle cabin. Some temperature sensors may provide the controller with measurements of temperatures of conditioned air exiting various outlet vents positioned in the particular zones of the vehicle cabin.

The controller allows vehicle occupants to select conditioned air settings for each of the zones within the vehicle independently of other zones, such that each of the zones may have different conditioned air settings. However, in certain conditions, one vehicle occupant may wish to override the conditioned air setting for other zones. In one example, a vehicle driver may wish to override conditioned air settings for other vehicle zones. In this example, the driver may synchronize each of the zones within the cabin to match one another. By activating the synchronization device, the driver may synchronize each of the zones to one or more of the conditioned air settings of a master zone. Additionally, the synchronization device may include at least one synchronization confirmation indicator that illuminates to indicate to the vehicle occupants which of the zones are synchronized to the master zone. Various embodiments of the vehicle temperature control system will be described in more detail herein.

Referring now to FIG. 1, one embodiment of a vehicle temperature control system 10 is depicted. As depicted in FIG. 1, the vehicle temperature control system 10 may be incorporated into a vehicle cabin 12 of a vehicle 11. The vehicle temperature control system 10 may include a first HVAC unit 30, a second HVAC unit 32, a first control panel 36, a second control panel 37, and a controller 34 electrically coupled to the first and second control panels 36, 37 and the first and second HVAC units 30, 32. The vehicle temperature control system 10 may also include a feed plenum 40 that provides conditioned air to the vehicle cabin 12 through a first zone ducting 42, a second zone ducting 44, and a third zone ducting 50. As used herein, "conditioned air" refers to air delivered to the vehicle cabin 12 from the feed plenum 40. The conditioned air may pass through various components of the first and/or second HVAC units 30, 32 to cool, heat, humidify, dehumidify, and/or pressurize the conditioned air for delivery to the vehicle cabin 12. Each of the first, second, and third zone ducting 42, 44, 50 are in fluid communication with at least one of the first or second HVAC units 30, 32. Each of the first, second, and third zone ducting 42, 44, 50 directs conditioned air to an associated first, second, or third zone within the vehicle cabin 12, as discussed below. The vehicle temperature control system 10 may also include temperature sensors 70, 72, 74, 80, 82, 90 positioned throughout the vehicle cabin 12 and/or within the feed plenum 40 or first zone, second zone, or third zone ducting 42, 44, 50. The temperature sensors 70, 72, 74, 80, 82, 90 are electrically coupled to the controller 34 and provide a local temperature measurement, as discussed below. Other embodiments of the vehicle temperature control system 10 according to the present disclosure may include additional HVAC units, control panels, and/or controllers based on particular end user requirements.

In the embodiment depicted in FIG. 1, the vehicle cabin 12 is located within an interior of the vehicle 11 and includes the area in which vehicle occupants, for example a driver, a front seat passenger, and/or rear seat passengers, are seated during vehicle operation. In the depicted embodiment, the vehicle cabin 12 includes three discrete zones: a first zone 20; a second zone 22; and a third zone 24. The first zone 20 includes a portion of the vehicle cabin 12 where the driver may be seated during vehicle operation. The second zone 22 includes a portion of the vehicle cabin 12 where the front seat passenger may be seated. The third zone 24 includes a portion of the vehicle cabin 12 where the rear seat passengers may be seated. In other embodiments of the vehicle temperature control system 10, the vehicle cabin 12 may be segregated into more than three zones, and the zones may be overlapping or distinct from each other.

Figure 4:
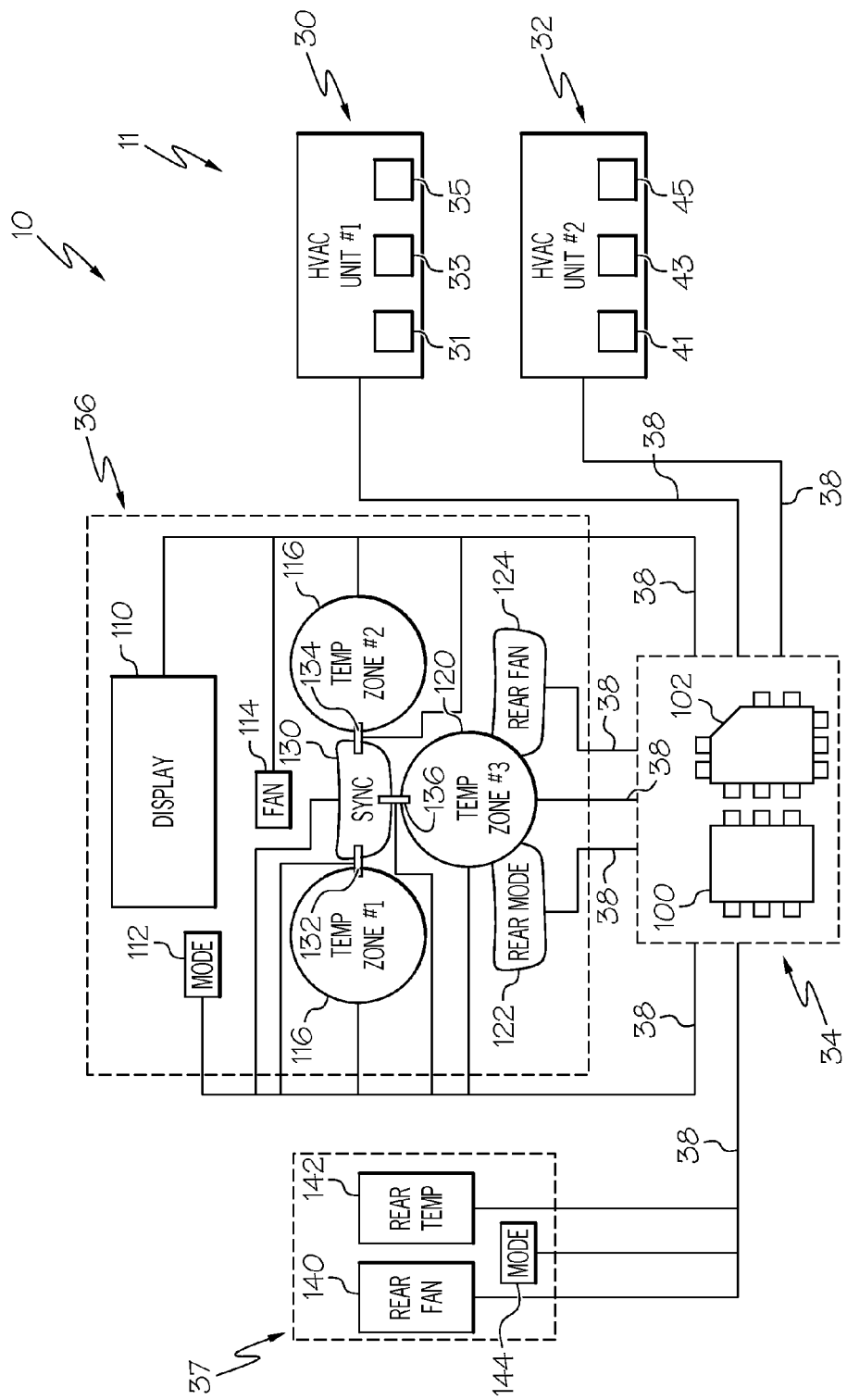
FIG. 4 depicts a front view of one embodiment of a second control panel according to one or more embodiments shown and described herein.

The first HVAC unit 30 includes a first compressor 31, a first blower 33, and a first heating element 35, and the second HVAC unit 32 includes a second compressor 41, a second blower 43, and a second heating element 45 (shown in FIG. 4). The first and second HVAC units 30, 32 may be of equal or different sizes or capabilities. For example, the first HVAC unit 30 may be designated as a primary HVAC unit and may have a greater functional capacity allowing the primary HVAC unit to condition a greater volume of air than the second HVAC unit 32. Similarly, the second HVAC unit 32 may be designated a secondary HVAC unit and may have a lower functional capacity than the first HVAC unit 30, thereby conditioning a reduced volume of air than the first HVAC unit 30. Utilizing a second HVAC unit 32 with a reduced functional capacity may be cost-effective, as smaller or lower performance compressors, blowers, or heater elements may be included in the second HVAC unit 32. In other embodiments, both the first and second HVAC units 30, 32 may be of similar or identical operational and functional capacity.

In these embodiments, both the first and second HVAC units 30, 32 collect and condition intake air from an external source, such as the atmosphere surrounding the vehicle 11 or an engine compartment of the vehicle 11. Air intake vents may be positioned with access to the exterior of the vehicle 11. In the embodiment depicted in FIG. 1, the first HVAC unit 30 primarily provides conditioned air to the first zone 20 and the second zone 22 of the vehicle cabin 12, while the second HVAC unit 32 primarily provides conditioned air to the third zone 24 of the vehicle cabin 12. The first HVAC unit 30 is in fluid communication with the first and second zone ducting 42, 44, which directs conditioned air from the first HVAC unit 30 to the first and second zones 20, 22, respectively. The second HVAC unit 32 is in fluid communication with rear ducting 50, which directs conditioned air from the second HVAC unit 32 to the third zone 24. The first and second HVAC units 30, 32 may also circulate and condition air from the vehicle cabin 12. Conditioning of the intake air may include conditioning processes such as heating, cooling, humidifying, or dehumidifying the intake air. Conditioned air exits the first and second HVAC units 30, 32 at an air outlet of the HVAC units 30, 32 into the feed plenum 40. The feed plenum 40 directs the conditioned air to the vehicle cabin 12. The feed plenum 40 may also blend the conditioned air with additional intake air that bypassed the HVAC units 30, 32 to satisfy temperature requirements in the vehicle cabin 12.

The controller 34 is electrically coupled to the first and second HVAC units 30, 32 with a communication link 38, which may be implemented as a bus or other electronic interface to facilitate communication between the components of the vehicle temperature control system 10. The controller may be additionally coupled to the first and second control panels 36, 37 via the communication link 38. The controller 34 is also electrically coupled to temperature sensors 70, 72, 74, 80, 82, 90 positioned within the vehicle cabin 12, ducting 42, 44, 50, and feed plenum 40.

The operating states of the first and second HVAC units 30, 32 are controlled by the controller 34. The first and second HVAC units 30, 32 are adapted to be operated at a variety of operating states such that conditioned air that is directed from the first and second HVAC units 30, 32 is conditioned to be delivered at certain environmental conditions. The environmental conditions are determined by the controller 34, and are based on inputs received by the controller 34 from the first and second control panels 36, 37 and temperature readings received from the temperature sensors 70, 72, 74, 80, 82, 90. For example, if a vehicle passenger requests heated air at an elevated temperature at the first or second control panels 36, 37, the controller 34 may command the first or second HVAC units 30, 32 to operate in a heating operating state. The first or second HVAC units 30, 32 may condition intake air using the first or second heating elements 35, 45, respectively. Alternatively, if a vehicle passenger requests cooled air at a reduced temperature at the first or second control panel 36, 37, the controller 34 may command the first or second HVAC units 30, 32 to operate in a cooling operating state and condition intake air using the first or second compressors 31, 41, respectively. Other operating states may include adjusting air flow into the vehicle cabin 12 by modifying a speed or power input to the first or second blowers 33, 43, or adjusting the location at which air is delivered to the vehicle cabin 12 by selecting various air outlets that are coupled to the first or second HVAC units 30, 32 through the ducting 42, 44, 50.

The controller 34 is also coupled to dampers 60, 62, 64 that are positioned proximate to the ducting 42, 44, 50 and the feed plenum 40. Each of the dampers 60, 62, 64 may be constructed of a variety of plastic or metal materials. In the embodiment depicted in FIG. 1, the first zone 20 of the vehicle cabin 12 has the first zone ducting 42, which includes dampers 60 positioned within the ducting 42. The second zone 22 of the vehicle cabin 12 has the second zone ducting 44, which includes dampers 62 positioned within the ducting 44. The third zone 24 of the vehicle cabin 12 has the third zone ducting 50, which includes dampers 64 positioned within the ducting 50. The dampers 60, 62, 64 may be positioned within the ducting 42, 44, 50, for example at choke points, entrances, elbows, or within straight areas of the ducting 42, 44, 50. The dampers 60, 62, 64 may incorporate anemometers or other air flow rate measurement devices to monitor air flow past the dampers 60, 62, 64. The dampers 60, 62, 64 may also selectively open or close to adjust the volume of conditioned air that passes each of the dampers 60, 62, 64. By selectively opening and closing, the dampers 60, 62, 64 adjust a throat area of the ducting 42, 44, 50, through which air may flow, as well as the volume of conditioned air that flows past the dampers 60, 62, 64 based on the pressure in the feed plenum 40. The dampers 60, 62, 64 may also allow diversion of air flow to create a blend of intake air and conditioned air, such that air delivered to the vehicle cabin 12 satisfies conditions determined by the controller 34. The dampers 60, 62, 64 may also direct conditioned or blended air to different outlet vents of the vehicle zones 20, 22, 24, for example to outlet vents positioned to direct conditioned air towards a face portion of the vehicle cabin 12, or at a torso portion, a window portion, or a foot portion, or a combination thereof, as discussed below.

The dampers 60, 62, 64 may also be opened or closed to control the volume of air that flows past each of the dampers 60, 62, 64 from the feed plenum 40 and into the first, second, or third zone ducting 42, 44, 50. For example, the dampers 60 at an entrance of the first zone ducting 42 may direct conditioned air to a face portion of the vehicle cabin 12, while the dampers 62 at an exit of the second zone ducting 44 may direct conditioned air to a foot portion of the vehicle cabin 12. Similarly, the dampers 60 in the first zone ducting 42 may allow a higher volume of intake air to be blended with the conditioned air delivered from the feed plenum 40 to reach a desired temperature, while the dampers 62 in the second zone ducting 44 may allow a higher volume of conditioned air from the feed plenum 40 to enter the vehicle cabin 12. In other embodiments, the dampers 60, 62, 64 may be positioned in the feed plenum 40 or in other locations throughout the ducting system.

After the air has passed the dampers 60, 62, 64 and has been blended with intake air if necessary, the combination of conditioned air and intake air is blended so as to form a conditioned air having a conditioned air temperature. The conditioned air is then delivered to the vehicle cabin 12 through various outlet vents 46, 48, 52 positioned within the vehicle cabin 12. In the first zone 20 of the vehicle cabin 12, outlet vents 46 are positioned such that conditioned air may be distributed at different locations within the first zone 20, such as at a face level, torso level, window level, or a foot level, etc. Similarly, in the second zone 22, outlet vents 48 are positioned at various locations and in the third zone 24, outlet vents 52 are positioned at various locations. Each of the outlet vents 46, 48, 52 may include additional dampers which allow opening and closing features of the outlet vents 46, 48, 52 by a passenger positioned in the vehicle cabin 12.

Temperature sensors 70, 72, 74, 80, 82, 90 may be used to detect air temperatures at various locations within the vehicle 11. Temperature sensors 70, 72, 74, 80, 82, 90 may be any one or combination of thermocouples, themistor sensors, resistance temperature sensors, or the like, with operating ranges from about −55° F. to about 155° F. Temperature measurements from the temperature sensors 70, 72, 74, 80, 82, 90 may be directed to the controller 34 such that the controller 34 may determine the conditioned air temperature. The controller 34 may use the temperature measurements to determine the operating states of the first and second HVAC units 30, 32, or to determine an instantaneous cabin temperature at a specific vehicle zone 20, 22, 24. Temperature measurements of the temperature sensors 70, 72, 74, 80, 82, 90 may also be used by the controller to control individual damper 60, 62, 64 movements.

In the embodiment depicted in FIG. 1, delivered air temperature sensors 70 are positioned at the outlet vents 46 in the first zone ducting 42; delivered air temperature sensors 72 are positioned at the outlet vents 48 in the second zone ducting 44; and delivered air temperature sensors 74 are positioned at the outlet vents 52 in the third zone ducting 50. The feed plenum 40 also includes a first central temperature sensor 80 and a second central temperature sensor 82. The first central temperature sensor 80 measures the conditioned air temperature in the feed plenum 40 as the conditioned air exits the first HVAC unit 30. The second central temperature 82 measures the conditioned air temperature in the feed plenum 40 as the conditioned air exits the second HVAC unit 32. At least one cabin temperature sensor 90 is also included in the vehicle temperature control system 10 and detects a cabin temperature. Additional temperature sensors may be included and may be placed in different locations throughout the ducting and vehicle cabin.

Each of the temperature sensors 70, 72, 74, 80, 82, 90 measures a temperature and is electrically coupled to the controller 34 to provide a reading of temperature. The controller 34 uses the temperature readings from the various temperature sensors 70, 72, 74, 80, 82, 90 to adjust operating states of the first and second HVAC units 30, 32 and the position of the dampers 60, 62, 64. By controlling the first and second HVAC units 30, 32 and the dampers 60, 62, 64, the controller 34 may make necessary adjustments in order to meet cabin temperature or conditioned air temperature requirements determined by input from the first and second control panels 36, 37. The controller 34 is also coupled to the first and second control panels 36, 37, which allow vehicle occupants to input desired settings. The first control panel 36 may be positioned proximate the first or second zones 20, 22 of the vehicle cabin 12 and accessible to the driver and/or front seat passenger. The second control panel 37 may be positioned in the third zone 24 of the vehicle cabin 12 and accessible to rear seat passengers.

Figure 2:
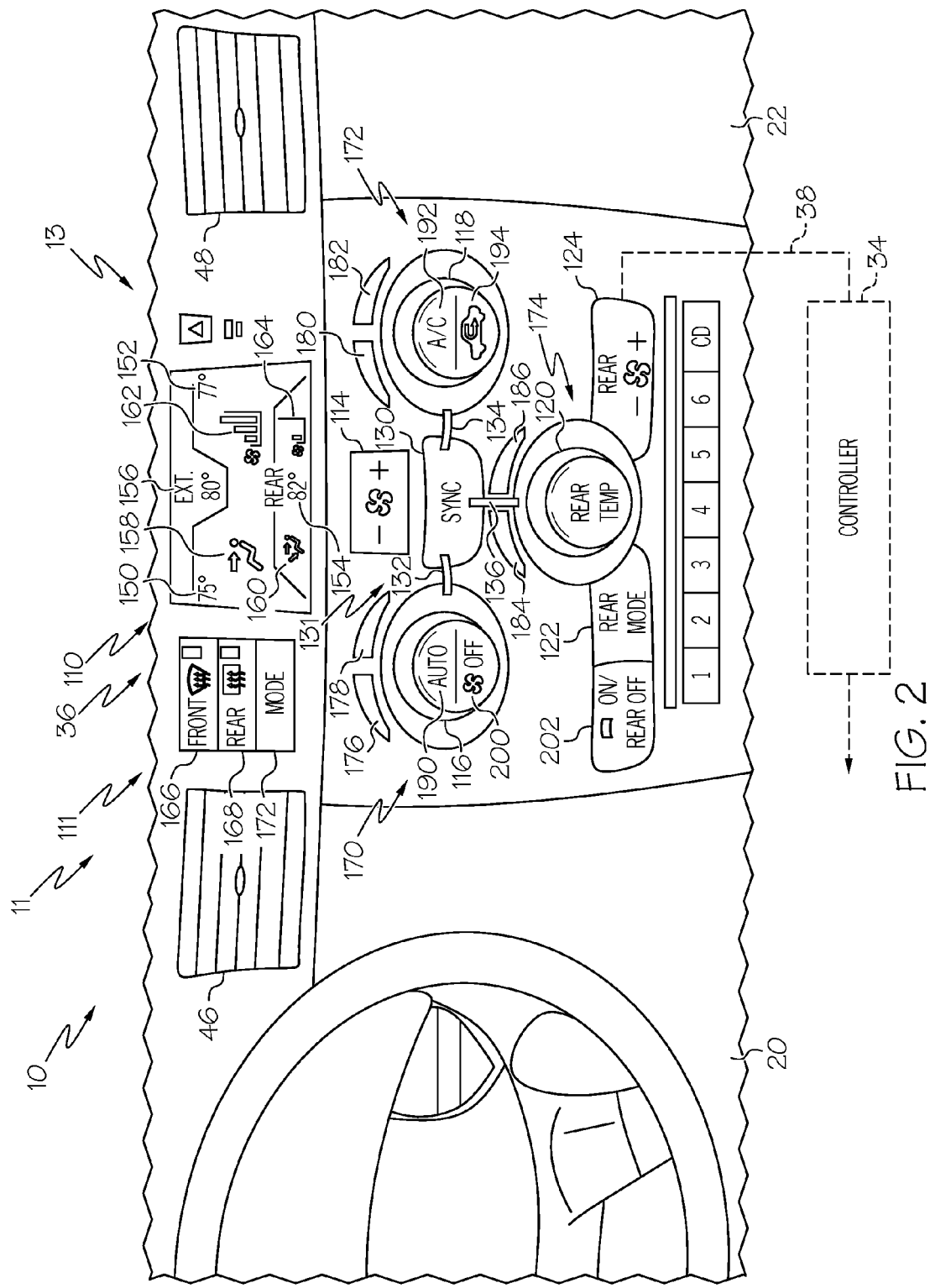
FIG. 2 depicts a front view of one embodiment of the vehicle temperature control system of FIG. 1 according to one or more embodiments shown and described herein.
Figure 3:
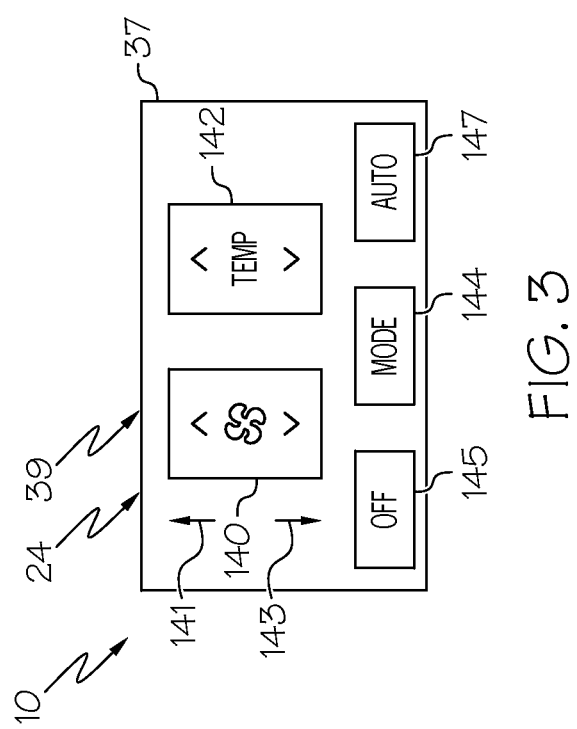
FIG. 3 depicts a schematic diagram of the vehicle temperature control system of FIG. 1 with control panels according to one or more embodiments shown and described herein.

Referring now to FIGS. 2 and 3, one embodiment of the vehicle temperature control system 10 is depicted as part of a vehicle dashboard 13. The vehicle temperature control system 10 includes a display 110 and first, second, and third zone temperature selection devices 116, 118, 120 that are rotatable knobs. Other embodiments of the temperature selection devices 116, 118, 120 may be rocker switches, sliding controls, button dials or other user interfaces. The first zone temperature selection device 116 may be rotated in decreased temperature direction 176 to select a lower desired temperature setting, and rotated in increased temperature direction 178 to select a higher desired temperature setting for the first zone 20. Similarly, the second zone temperature selection device 118 may be rotated in decreased temperature direction 180 to select a lower desired temperature setting, and rotated in increased temperature direction 182 to select a higher desired temperature setting for the second zone 22. The third zone temperature selection device 120 may be rotated in decreased temperature direction 184 to select a lower desired temperature setting, and rotated in increased temperature direction 186 to select a higher desired temperature setting for the third zone 24. The decreased temperature directions 176, 180, 184 and increased temperature directions 178, 182, 186 may be color coded, for example using a blue color indicating the decreased temperature directions 176, 180, 184 and a red color indicating the increased temperature directions 178, 182, 186.

The first control panel 36 includes the display 110, as well as a plurality of selectable input devices 111, such as a primary mode selection device 112, a primary fan speed selection device 114, the first zone temperature selection device 116, the second zone temperature selection device 118 and the third zone temperature selection device 120. The first control panel 36 also may include a third zone mode selection device 122 and a third zone fan speed selection device 124. Additionally, the first control panel 36 includes a synchronization device 130 with a synchronization confirmation indicator 131. The synchronization confirmation indicator 131 may include a plurality of indicators including a first synchronization indicator 132, a second synchronization indicator 134, and a third synchronization indicator 136. The synchronization indicators 132, 134, 136 may be positioned on or proximate to the synchronization device 130, or elsewhere on the vehicle dashboard 13. The first synchronization indicator 132 indicates whether the current desired temperature setting of the first zone 20 is synchronized with at least one other zone. The second synchronization indicator 134 indicates whether the current desired temperature setting of the second zone 22 is synchronized with the first zone 20. The third synchronization indicator 136 indicates whether the current desired temperature setting of the third zone 24 is synchronized with the first zone 20. The synchronization indicators 132, 134, 136 may be positioned such that each indicator is in a proximal relationship relative to one another corresponding to the position of the outlet vents 46, 48, 52 in the vehicle 11, as shown in FIG. 2. For example, the first synchronization indicator 132 is positioned in an upper left position, the second synchronization indicator 134 is positioned in an upper right position, and the third synchronization indicator 136 is positioned in a lower position relative to the first and second synchronization indicators 132, 134.

The vehicle dashboard 13 also includes a front defrost button 166 and a rear defrost button 168, which may communicate with the controller 34 to adjust the dampers 60, 62, 64 so as to direct conditioned air to a front or rear windshield of the vehicle, respectively. The vehicle dashboard 13 may also include a system power button 200, an air conditioner power button 192, and an air recirculation button 194. An automatic button 190, labeled in FIG. 1 as "auto," is also included that may activate an automatic mode, which allows operating the controller 34 to automatically determine a desired temperature setting, a mode selection setting, and a fan speed selection setting of the first and second HVAC units 30, 32 in order to reach a desired cabin temperature. When the automatic button 190 is activated, and one of the settings controlled by the controller 34 is manually adjusted, the automatic mode may be overridden such that the vehicle occupant resumes independent control over the vehicle temperature control system 10. In other embodiments, a partial override of the automatic mode may allow for only the manually adjusted setting to be overridden, leaving the unadjusted settings of the system in automatic mode.

The first control panel 36 may also include a third zone power device 202, which activates or deactivates the second control panel 37. Additionally, the first control panel 36 may be able to override any settings selected on the second control panel 37 by programming priority logic on the controller 34 such that adjustments using the third zone input devices 120, 122, 124 on the first control panel 36 are prioritized.

The plurality of selectable input devices 111 on the first control panel 36, including the primary mode selection device 112, primary fan speed selection device 114, third zone mode selection device 122, or third zone fan speed selection device 124 may be any one of a button, switch, rotatable knob, or other manually configurable control device. Similarly, the first, second, and third zone temperature selection devices 116, 118, 120 may be any one of buttons, switches, rotatable knobs, or another manually configurable control device. The synchronization device 130 and third zone power device 202 may also be a button or switch. The first, second, and third synchronization indicators 132, 134, 136 may be light emitting diodes (LEDs), organic LEDs, lasers, bulbs, including fluorescent, halogen, or incandescent bulbs, or other light sources and may be any color, including white, blue, green, or red.

In the embodiment depicted in FIG. 2, the display 110 may be any one of a touchscreen display, a light emitting diode (LED) display, a liquid crystal display, a plasma display, or the like. The display 110 communicates information to the vehicle occupants, as discussed in detail below. The primary mode selection device 112 allows vehicle occupants in the first and second zones 20, 22 of the vehicle cabin 12 to adjust a delivered air location mode, such as at a face level, a foot level, a windshield level, or at a combination of any of these levels. The primary fan speed selection device 114 allows vehicle occupants in the first and second zones 20, 22 of the vehicle cabin 12 to select a fan speed that adjusts an air pressure in the feed plenum 40, such that the speed of air delivered to the vehicle cabin 12 through the outlet vents 46, 48 in the first and second zones 20, 22 is changed. In other embodiments, the first and second zones 20, 22 may have independent controls for mode selection and/or fan speed.

The display 110 allows the vehicle occupants to view information regarding the vehicle temperature control system 10. In the embodiment depicted in FIG. 2, the display 110 depicts a current first zone desired temperature setting 150, a current second zone desired temperature setting 152, and a current third zone desired temperature setting 154. The display 110 also depicts an exterior temperature 156, which indicates an ambient temperature outside the vehicle. The display 110 also depicts a primary mode setting 158 and a secondary mode setting 160, which indicates the air delivery mode for the first and second zones 20, 22, and the third zone 24, respectively. The display may further depict a primary fan speed setting 162 and a secondary fan speed setting 164, indicative of the fan speed setting for the first and second zones 20, 22, and the third zone 24, respectively. The display 110 may show the settings as numbers, words, colors, graphs, graphics, or other indicia. Using information from the display 110, vehicle occupants may be able to determine the independent settings of each of the zones 20, 22, 24 within the vehicle cabin 12. In the depicted embodiment, the information shown on the display 110 relating to the vehicle temperature control system 10 status is positioned in a proximal relationship to the respective zones within the vehicle 11.

In the depicted embodiment, the first, second, and third zone temperature selection devices 116, 118, 120 allow vehicle occupants to select a conditioned air temperature, or desired ambient temperature, for each respective zone 20, 22, 24 within the vehicle cabin 12. Temperature readings from the delivered air temperature sensors 70, 72, 74 positioned at the outlet vents may be used by the controller 34 to determine the correct operating state for the first and second HVAC units 30, 32. In other embodiments, the first, second, and third zone temperature selection devices 116, 118, 120 may allow vehicle occupants to select a particular cabin temperature or a particular zone temperature instead of a delivered air temperature. In this instance, for example, the controller 34 may use temperature readings from the cabin temperature sensor 90 to determine the appropriate operating states for the first and second HVAC units 30, 32. The controller 34 may also use temperature readings from the central temperature sensors 80, 82 to determine the movement of the dampers 60, 62, 64 in order to achieve a certain blend or mixture of conditioned air and intake air. The third zone mode and fan speed selection devices 122, 124 and the third zone power device 202 on the first control panel 36 allow the vehicle occupants in the first and second zones 20, 22 to override settings selected by the second control panel 37. The third zone power device 202 also allows vehicle occupants seated in the first and second zones 20, 22 to enable or disable the second, or rear, control panel 37.

The second control panel 37 may include a plurality of selectable input devices 39, for example a third zone fan speed selection device 140, a third zone temperature selection device 142, and a third zone mode selection device 144. One embodiment of the second control panel 37 is depicted in FIG. 3, where the third zone temperature selection device 142 and third zone fan speed selection device 140 may incrementally increase the third zone desired temperature setting and third zone fan speed, respectively, by moving rocker devices 140, 142 in an upwards direction 141, or may incrementally reduce the settings by moving the rocker devices 140, 142 in a downwards direction 143. In further embodiments, the rocker devices 140, 142 may include a plurality of discrete buttons that are individually depressed by a vehicle occupant. In other embodiments, the rocker devices 140, 142 may be operable to be moved in different directions, such as left or right, a transverse direction, or rotatable. The third zone temperature selection device 120, and associated third zone controls 122, 124, 202 of the first control panel 36 may be operable to override any selection or setting of the second control panel 37. The second control panel 37 may be positioned to allow rear seat passengers to modify the settings of the third zone 24, for example proximate to the ceiling or on a sidepanel of the vehicle 11. The second control panel 37 may also include a power button 145 for powering the second HVAC unit 32 on and off as well as an automatic button 147 for activating an automatic mode for automatic control of the second HVAC unit 32.

The second control panel 37 may be positioned in the third zone 24 of the vehicle cabin 12. Each of the devices 140, 142, 144 may be one of a button, switch, rotatable knob, or other manually configurable control device. The third zone fan speed selection device 140 may allow a vehicle occupant to adjust the air pressure in the feed plenum 40, such that the speed of delivered air from the third zone outlet vents 52 is adjusted. The third zone temperature selection device 142 may allow a vehicle occupant to select a delivered air temperature, and the third zone mode selection device 144 may allow a vehicle occupant to adjust a delivered air location mode, such as at a face level, a foot level, a windshield level, or at a combination thereof.

Referring now to FIG. 4, a schematic view of the first control panel 36, the second control panel 37, the first and second HVAC units 30, 32, and the controller 34 is depicted. The controller 34 includes a processor 100 and a memory 102 electrically coupled to the processor 100. The processor 100 may include any electrical processing component configured to receive and execute instructions (for example from the memory 102). The memory 102 may be non-transitory, with computer readable instructions stored on the memory 102. The memory 102 may be configured as nonvolatile computer readable media and may include hard disk drives, flash memory, registers and/or other types of storage components. Additionally, the memory 102 may be configured to store operating logic, that may be embodied as a computer program, firmware, or hardware.

As discussed herein above, the synchronization device 130 may be a button, a switch, a rotatable knob, or other device that is electrically coupled to the controller 34. The synchronization device 130 causes the processor 100 to execute a set of computer readable instructions stored in the memory 102. The synchronization confirmation indicator 131 provides a visual representation of any synchronized zones within the vehicle to the vehicle occupants via the synchronization indicators 132, 134, 136. The synchronization indicators 132, 134, 136 may be part of a unitary LCD assembly or otherwise may be distinct LEDs. The synchronization indicators 132, 134, 136 may also be various colors and may be configured to illuminate at various intensities. For example, the synchronization indicators 132, 134, 136 may operate at a higher intensity during daylight and a lower intensity at night.

Depressing the synchronization device 130 causes the processor 100 to execute logic as directed by the computer readable instruction set such that the current settings for the first, second, and third zone temperature selection devices 116, 118, 120 are automatically overridden and set to match the setting selected by a designated master zone. Additionally, if the synchronization device 130 is activated and the third zone is currently powered off, the third zone will automatically be powered on. In this embodiment, the first zone 20, which corresponds to the location of the vehicle driver, acts as the master zone. This may allow the driver to control the entire vehicle temperature control system 10 from a singular location, without having to manually adjust any independent controls other than his own.

In one example, the first zone temperature selection device 116 is set to a setting of 70° F., the second zone temperature selection device 118 is set to a setting of 75° F., and the third zone temperature selection device 120 is set to a setting of 78° F. When the synchronization device 130 is activated, the first, second, and third zone temperature selection devices 116, 118, 120 will each automatically be overridden and adjusted to match the desired temperature setting of the first zone temperature selection device 116, such that each of the second and third zones will be adjusted to a setting of 70° F. In some embodiments of the vehicle temperature control system 10, the synchronization device 130 may override settings other than the temperature, for example the fan speed setting or the mode setting. In other embodiments, the master zone may not be the first zone, or may otherwise be designated by the vehicle occupants. In yet other embodiments, the master zone may be assignable by the vehicle occupants, or may otherwise be a fixed zone.

When any of the first, second, or third zone desired temperature settings are synchronized, the settings will remain synchronized by the processor 100 such that when the master zone setting is adjusted, the slave zones settings are simultaneously adjusted. In one example, the first, second, and third zone desired temperature settings are synchronized at a temperature of 70° F. When the master zone, here the first zone 20, desired temperature setting is adjusted to 75° F., both the second and third desired temperature settings will be adjusted to 75° F. by the controller 34. In another example, the first and second zone desired temperature settings are synchronized. When the master zone, here the first zone 20, desired temperature setting is adjusted, the controller 34 will adjust the second zone desired temperature setting to the same setting as the master zone desired temperature setting. The controller 34, however, will maintain the third zone desired temperature setting at its original setting as only the first and second zones 20, 22 are synchronized. However, if any of the first, second, or third zone desired temperature settings are synchronized and any of the desired temperature settings for zones other than the master zone, such as the second or third zones 22, 24, is independently adjusted using the specific temperature selection device for that zone, then the zone with the independently adjusted desired temperature setting will no longer be synchronized to the master zone, while the remaining zones will remain synchronized.

When any of the second or third zone desired temperature settings are synchronized with the first zone 20, a respective synchronization indicator 134, 136 will be illuminated in conjunction with the first synchronization indicator 132. In one example, each of the first, second, and third zone desired temperature settings are synchronized and each of the first, second, and third synchronization indicators 132, 134, 136 are illuminated. In another example, the first, second, and third zones 20, 22, 24 are synchronized to the first zone 20 desired temperature setting and all three of the synchronization indicators 132, 134, 136 are illuminated. When the third zone 24 desired temperature setting is adjusted using the third zone temperature selection device 142, the third zone 24 is no longer synchronized to the first zone 20 desired temperature setting and the third synchronization indicator 136 will be extinguished. The first and second zones 20, 22 remain synchronized and the first and second synchronization indicators 132, 134 remain illuminated. In the embodiment described above, although only the desired temperature settings are disclosed as being synchronized, additional features, for example a fan speed or mode, may also be synchronized according to the settings of the master zone. The synchronization indicators may reflect such syncing. Additional embodiments and processor logic will be discussed herein.

Figure 5:
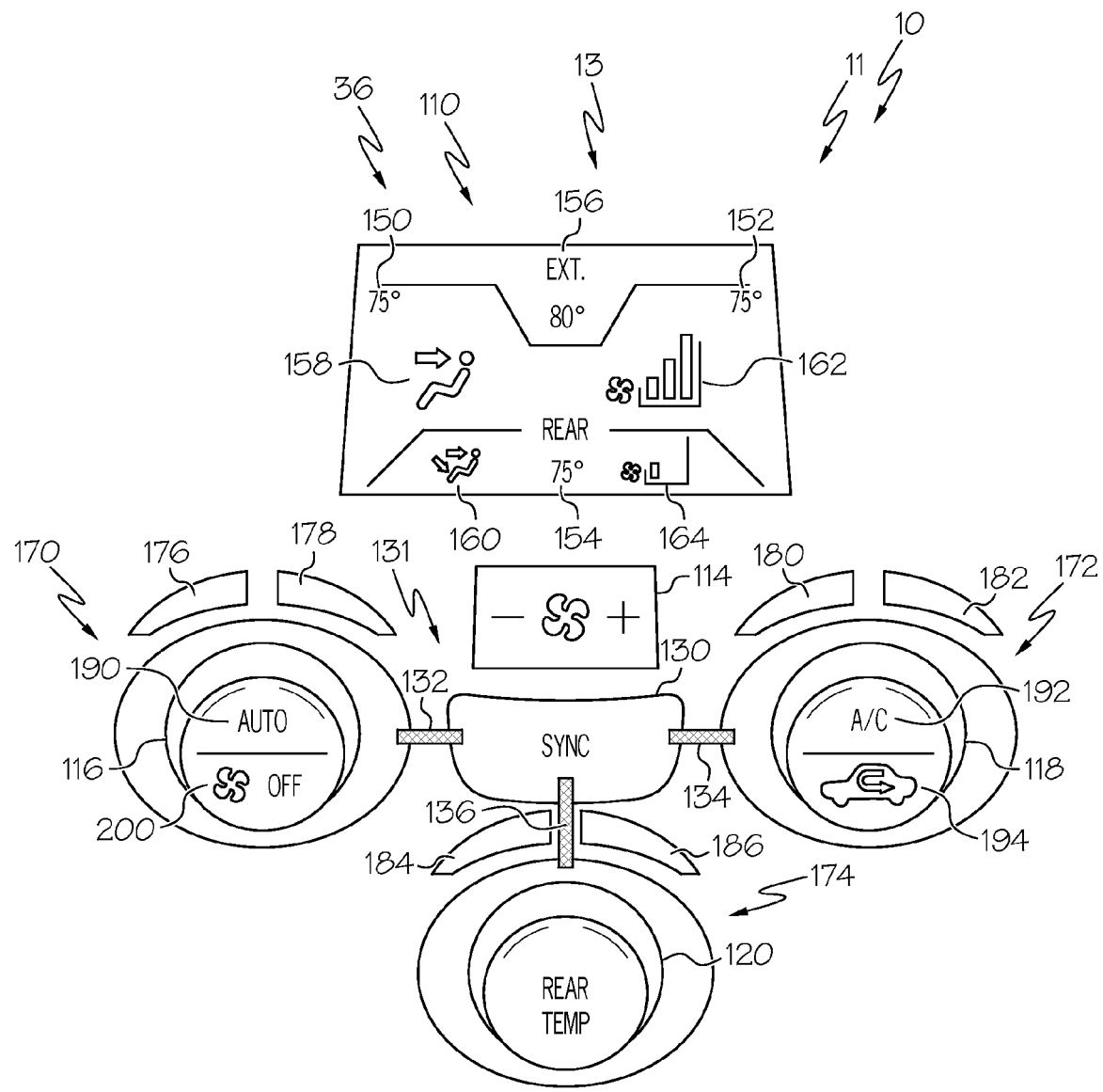
FIG. 5 depicts a front view of the vehicle temperature control system of FIG. 2 in an operating state according to one or more embodiments shown and described herein.
Figure 6:
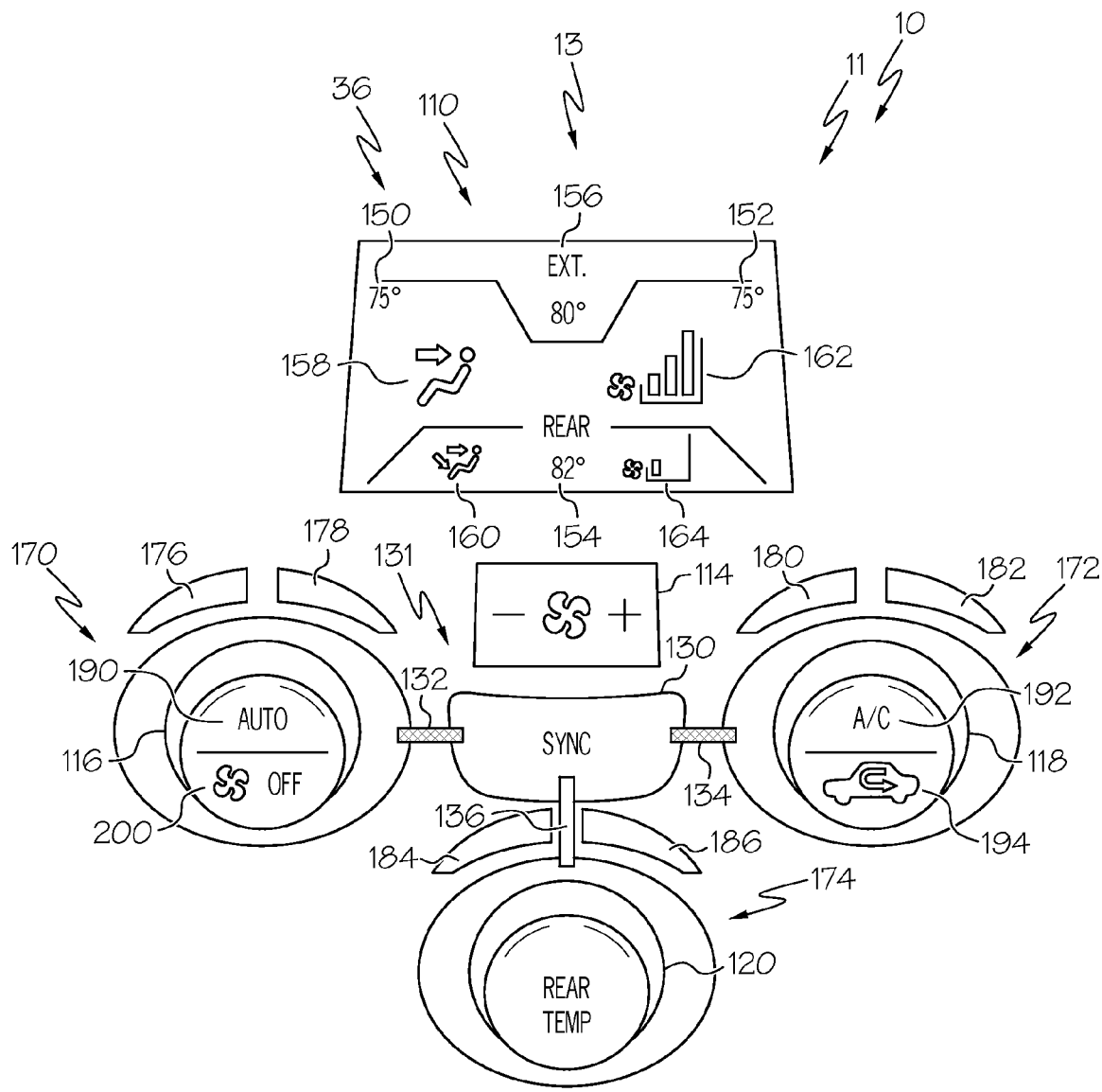
FIG. 6 depicts a front view of the vehicle temperature control system of FIG. 2 in an operating state according to one or more embodiments shown and described herein.
Figure 7:
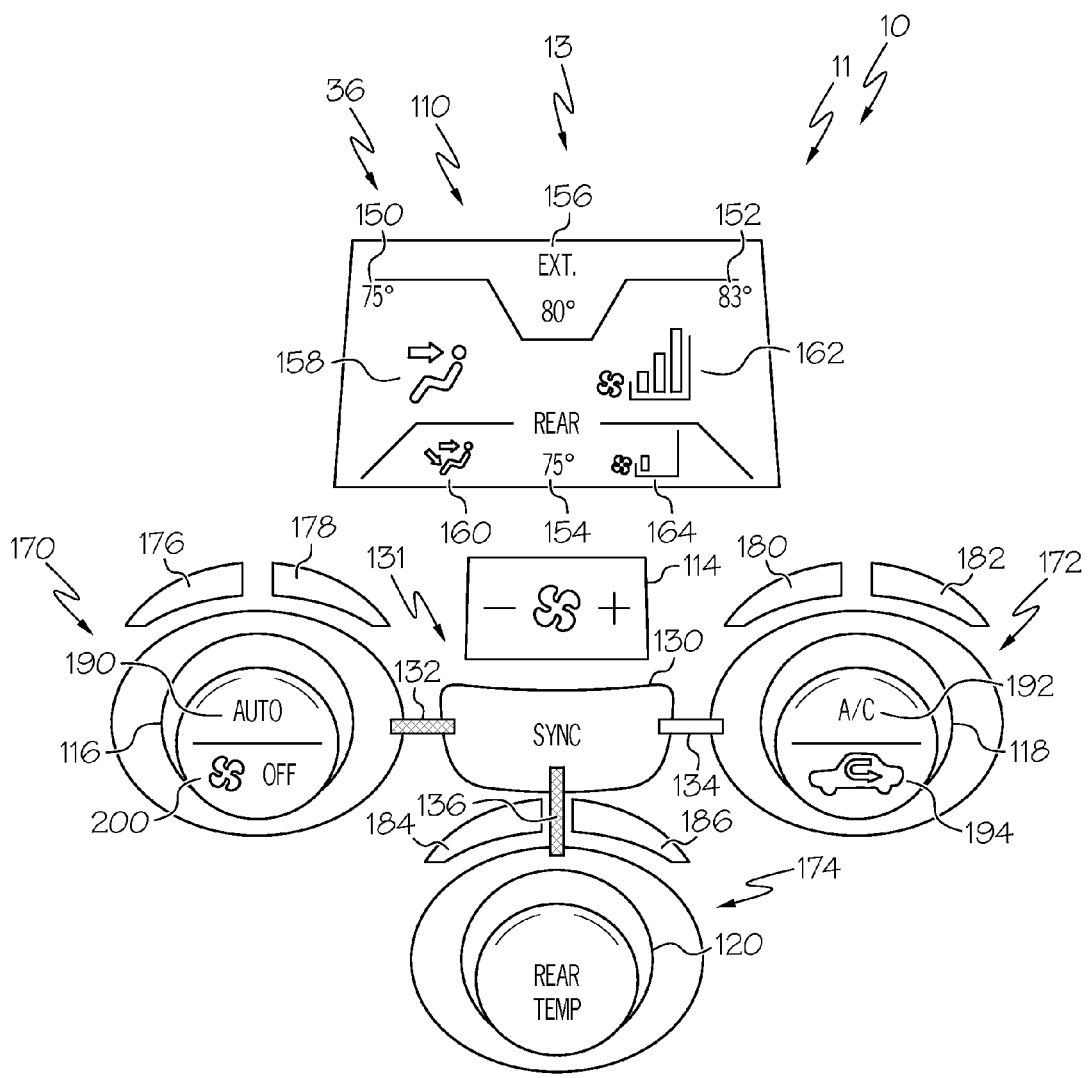
FIG. 7 depicts a front view of the vehicle temperature control system of FIG. 2 in an operating state according to one or more embodiments shown and described herein.

Referring now to FIGS. 5-7, configurations of the vehicle temperature control system 10 for various control settings of the first and second HVAC units 30, 32 are depicted in regard to the examples discussed below. In one example, depicted in FIG. 5, the first control panel 36 is depicted as part of the vehicle dashboard 13. As shown, the first, second, and third synchronization indicators 132, 134, 136 are illuminated, indicating that the desired temperature settings of the second and third zones 22, 24 are synchronized to the master zone, or the first zone 20. Accordingly, each of the current first, second, and third zone desired temperature settings are indicated 150, 152, 154, respectively, on the display 110 as 75° F. In this instance, if the first zone temperature selection device 116 is adjusted to a different desired temperature setting, the second and third zone desired temperature settings will be automatically adjusted to match the first zone desired temperature setting. If a vehicle occupant turns the first zone temperature selection device 116 towards decreased temperature direction 176 and stops at 70° F., both the second zone and third zone desired temperature settings will automatically be adjusted to 70° F., and the display will be updated. The remaining settings, such as fan speed and mode, however, will remain unchanged for the second and third zones 22, 24. Additionally, while the desired temperature settings for the second and third zones will be automatically updated, the physical control devices do not have to be adjusted. As shown in FIG. 5, the mode setting indicator 158 and fan speed setting indicator 162 for the first and second zones is different than the fan speed setting indicator 164 and mode setting indicator 160 for the third zone.

In another example depicted in FIG. 6, the third zone 24 of the vehicle is initially set to deliver air with a temperature of 75° F. A vehicle occupant adjusts the third zone desired temperature setting using either the third zone temperature selection device 120 on the first control panel 36 or the third zone temperature selection device 142 on the second control panel 37, such that the third zone desired temperature setting will no longer be synchronized to the master zone, here the first zone 20, and the third synchronization indicator 136 for the third zone will be extinguished. In FIG. 6, the third zone desired temperature setting has been adjusted using either third zone temperature selection device 120 or 142 to a new setting of 82° F. The third synchronization indicator 136 for the third zone is extinguished, while the first and second zones 20, 22 remain synchronized and the respective synchronization indicators 132, 134 illuminated. Adjusting a setting for the third zone 24 other than temperature selection, however, does not cause the third zone 24 to become unsynchronized from the first zone 20.

Another example is depicted in FIG. 7. A vehicle occupant in the second zone 22 adjusts the second zone desired temperature setting using the second zone temperature selection device 118, the second zone 22 will become unsynchronized from the first zone 20, and the second synchronization indicator 134 will be extinguished. In FIG. 7, the second zone desired temperature setting has been adjusted to 83° F., as shown on the display 110 as element 152, and the second synchronization indicator 134 has been extinguished. The first zone 20 and third zone 24 remain synchronized.

If a vehicle occupant resynchronizes the first, second, and third zone 20, 22, 24 desired temperature settings, the vehicle occupant may then activate the synchronization device 130, causing the second and third zones 22, 24 to synchronization to the current desired temperature setting of the first zone 20, for example the settings shown in FIG. 5. The three synchronization indicators 132, 134, 136 will become illuminated, signaling to the vehicle occupants that the three zones 20, 22, 24 each have a current desired temperature setting synchronized to the first zone 20. When the three zones 20, 22, 24 are synchronized, activating the synchronization device 130 may not have an effect on the vehicle temperature control system 10.

The above-described disclosure may allow vehicle occupants to quickly identify whether different zones within a vehicle are synchronized to a master zone. Additionally, a single vehicle occupant may be able to synchronization all of the zones within the vehicle to the same desired temperature setting as the master zone, allowing the single occupant to control the temperature throughout the vehicle without having to physically adjust the settings with each physical control. Instead, the occupant can synchronization each of the zones to a master zone, and adjust the physical control for the master zone to change the desired temperature settings for every zone in the vehicle. When there are multiple vehicle occupants, the present disclosure also allows occupants in different zones of the vehicle to independently adjust a desired temperature setting for their zone, while leaving the remaining zones synchronized to the master zone.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle temperature control system comprising:
   a first heating, ventilation, and air conditioning (HVAC) unit comprising a first compressor, a first blower, and a first heating element;
   a first ducting in fluid communication with the first HVAC unit that selectively directs air to a first zone and a second zone of a vehicle through a plurality of outlet vents;
   a second HVAC unit comprising a second compressor, a second blower, and a second heating element;
   a second ducting in fluid communication with the second HVAC unit that selectively directs air to a third zone of the vehicle through a plurality of outlet vents;
   an electronic controller electrically coupled to the first HVAC unit and the second HVAC unit, the electronic controller comprising a processor and a memory storing a computer readable instruction set;
   a first zone temperature selection device electrically coupled to the electronic controller, wherein the first zone temperature selection device selects a first zone desired temperature setting of the first zone;
   a second zone temperature selection device electrically coupled to the electronic controller, wherein the second zone temperature selection device selects a second zone desired temperature setting of the second zone;
   a third zone temperature selection device electrically coupled to the electronic controller, wherein the third zone temperature selection device selects a third zone desired temperature setting of the third zone; and
   a synchronization device electrically coupled to the electronic controller, wherein the processor executes the computer readable instruction set to:
      synchronize the second zone temperature selection device and the third zone temperature selection device to the first zone temperature selection device, when the synchronization device is activated, wherein the second zone desired temperature setting and the third zone desired temperature setting are set to the first zone desired temperature setting;
      unsynchronize the third zone temperature selection device from the first zone temperature selection device and the second zone temperature selection device, when the third zone temperature selection device is adjusted, wherein the second zone temperature selection device remains synchronized to the first zone temperature selection device, and wherein the third zone desired temperature setting is independent of the first zone desired temperature setting and the second zone desired temperature setting; and
      modify an operating state of the first HVAC unit, the second HVAC unit, or both the first HVAC unit and the second HVAC unit to direct conditioned air to the first zone according to the first zone desired temperature setting, the second zone according to the second zone desired temperature setting, and the third zone according to the third zone desired temperature setting.

2. The vehicle temperature control system of claim 1, wherein the operating state is selected from the group consisting of blower speed, compressor operation, heating element operation, or outlet vent selection.

3. The vehicle temperature control system of claim 1, wherein the electronic controller further comprises a synchronization confirmation indicator, and the electronic controller controls illumination of the synchronization confirmation indicator when one of blower speed, compressor operation, or heating element operation or outlet vent selection of the second HVAC unit matches the operation of the first HVAC unit.

4. The vehicle temperature control system of claim 3, further comprising a damper in fluid communication with the first ducting and a feed plenum, the damper being controlled by the electronic controller to selectively open or close to modify a proportion of air delivered from the feed plenum to the first zone, the second zone, or the third zone of the vehicle.

5. The vehicle temperature control system of claim 4, wherein the proportion of air delivered from the feed plenum to the first zone differs from the proportion of air delivered from the feed plenum to the second zone.

6. The vehicle temperature control system of claim 5, wherein the synchronization confirmation indicator selectively indicates synchronization of the first zone, the second zone, and the third zone.

7. The vehicle temperature control system of claim 1, further comprising a first temperature sensor positioned proximate to the first zone and a second temperature sensor positioned proximate to the second zone, the first temperature sensor and the second temperature sensor electrically coupled to the electronic controller.

8. The vehicle temperature control system of claim 7, further comprising a third temperature sensor positioned proximate to the third zone, the third temperature sensor electrically coupled to the electronic controller.

9. A vehicle temperature control system comprising:
   a heating, ventilation, and air conditioning (HVAC) unit comprising a compressor, a blower, and a heating element;
   a feed plenum;
   a plurality of outlet vents positioned in a first zone, a second zone, and a third zone;
   ducting in fluid communication with the HVAC unit, the feed plenum, and the plurality of outlet vents, the ducting comprising a plurality of dampers adapted to selectively open and close to modify a proportion of air delivered to each of the first, second, and third zones from the feed plenum; and an electronic controller comprising a processor and a memory storing a computer readable instruction set;

a first zone temperature selection device electrically coupled to the electronic controller, wherein the first zone temperature selection device selects a first zone desired temperature setting of the first zone;

a second zone temperature selection device electrically coupled to the electronic controller, wherein the second zone temperature selection device selects a second zone desired temperature setting of the second zone;

a third zone temperature selection device electrically coupled to the electronic controller, wherein the third zone temperature selection device selects a third zone desired temperature setting of the third zone; and a synchronization device electrically coupled to the electronic controller, wherein synchronization device comprises a synchronization confirmation indicator, and wherein the processor executes the computer readable instruction set to:

synchronize the second zone temperature selection device and the third zone temperature selection device to the first zone temperature selection device, when the synchronization device is activated, wherein the dampers are positioned to provide a uniform proportion of air delivered to each of the first, second, and third zones from the feed plenum;

illuminate portions of the synchronization confirmation indicator corresponding to the first, second, and third zones whose operation is synchronized; and unsynchronize the third zone temperature selection device from the first zone temperature selection device and the second zone temperature selection device, when the third zone temperature selection device is adjusted, wherein the second zone temperature selection device remains synchronized to the first zone temperature selection device.

10. The vehicle temperature control system of claim 9, further comprising a control panel comprising a plurality of selectable input devices, the plurality of selectable input devices are electrically coupled to the electronic controller and provide input commands to control operation of the vehicle temperature control system.

11. The vehicle temperature control system of claim 9, wherein when the third zone temperature selection device is adjusted, the portion of the synchronization confirmation indicator corresponding to the third zone is extinguished.

12. The vehicle temperature control system of claim 11, wherein portions of the synchronization confirmation indicator corresponding to the first zone, the second zone, and the third zone are positioned in a proximal relationship corresponding to the position of the outlet vents in the vehicle.

13. A vehicle temperature control system comprising:
one or more heating, ventilation, and air conditioning (HVAC) units;
ducting in fluid communication with the one or more HVAC units that selectively direct conditioned air to a first zone, a second zone, and a third zone of a vehicle cabin through a plurality of outlet vents;
an electronic controller electrically coupled to the one or more HVAC unit, the electronic controller comprising a processor, and a memory storing a computer readable instruction set;
a first zone temperature selection device electrically coupled to the electronic controller, wherein the first zone temperature selection device selects a first zone desired temperature setting of the first zone of the vehicle cabin;

a second zone temperature selection device electrically coupled to the electronic controller, wherein the second zone temperature selection device selects a second zone desired temperature setting of the second zone of the vehicle cabin;

a third zone temperature selection device electrically coupled to the electronic controller, wherein the third zone temperature selection device selects a third zone desired temperature setting of the third zone of the vehicle cabin; and a synchronization device electrically coupled to the electronic controller, wherein the processor executes the computer readable instruction set to:

synchronize the second zone temperature selection device and the third zone temperature selection device to the first zone temperature selection device, when the synchronization device is activated, wherein the second zone desired temperature setting and the third zone desired temperature setting are set to the first zone desired temperature setting;

unsynchronize the third zone temperature selection device from the first zone temperature selection device and the second zone temperature selection device, when the third zone temperature selection device is adjusted, wherein the second zone temperature selection device remains synchronized to the first zone temperature selection device, and wherein the third zone desired temperature setting is independent of the first zone desired temperature setting and the second zone desired temperature setting; and modify an operating state of the one or more HVAC units to direct the conditioned air to the first zone according to the first zone desired temperature setting, the second zone according to the second zone desired temperature setting, and the third zone according to the third zone desired temperature setting.

14. The vehicle temperature control system of claim 13, further comprising a temperature sensor electrically coupled to the electronic controller, wherein the processor executes the computer readable instruction set to:
receive a temperature reading from the temperature sensor, wherein the operating state of the one or more HVAC units is modified according to the temperature reading.

15. The vehicle temperature control system of claim 14, wherein the temperature sensor is located in the ducting.

16. The vehicle temperature control system of claim 14, wherein the temperature sensor is located in the first zone, the second zone, or the third zone.

17. The vehicle temperature control system of claim 13, further comprising a synchronization confirmation indicator electrically coupled to the electronic controller, wherein synchronization confirmation indicator comprises a first synchronization indicator, a second synchronization indicator, and a third synchronization indicator, and wherein the processor executes the computer readable instruction set to:
illuminate the first synchronization indicator, the second synchronization indicator, and the third synchronization indicator, when the synchronization device is activated.

18. The vehicle temperature control system of claim 17, wherein the processor executes the computer readable instruction set to extinguish the third synchronization indicator, when the third zone temperature selection device is adjusted.

19. The vehicle temperature control system of claim 13, wherein the processor executes the computer readable instruction set to adjust the first zone desired temperature setting, the second zone desired temperature setting, and the third zone desired temperature setting to match a desired temperature setting, when the first zone temperature selection device is adjusted, and the first zone temperature selection device, the second zone temperature selection device and the third zone temperature are synchronized.

* * * * *